US011556258B1

(12) United States Patent
Huang et al.

(10) Patent No.: US 11,556,258 B1
(45) Date of Patent: Jan. 17, 2023

(54) IMPLEMENTING AUTOMATIC RATE CONTROL IN A MEMORY SUB-SYSTEM

(71) Applicant: Micron Technology, Inc., Boise, ID (US)

(72) Inventors: Ying Huang, Boise, ID (US); Mark Ish, San Ramon, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/379,118

(22) Filed: Jul. 19, 2021

(51) Int. Cl.
*G06F 3/06* (2006.01)
*G06F 12/02* (2006.01)

(52) U.S. Cl.
CPC .......... *G06F 3/0634* (2013.01); *G06F 3/0617* (2013.01); *G06F 3/0635* (2013.01); *G06F 3/0659* (2013.01); *G06F 3/0679* (2013.01); *G06F 12/0246* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 2014/0181370 | A1* | 6/2014 | Cohen | G06F 12/0246 711/103 |
| 2017/0109276 | A1* | 4/2017 | Lee | G06F 12/0246 |
| 2017/0212678 | A1* | 7/2017 | Blount | G06F 3/0659 |
| 2019/0073140 | A1* | 3/2019 | Yamada | G06F 3/064 |
| 2021/0382653 | A1* | 12/2021 | Muthiah | G06F 3/0659 |
| 2022/0269435 | A1* | 8/2022 | Yoon | G06F 3/0659 |

* cited by examiner

*Primary Examiner* — Kevin Verbrugge
(74) *Attorney, Agent, or Firm* — Lowenstein Sandler LLP

(57) ABSTRACT

A processing device in a memory system identifies, while the memory device is in a first state condition, a plurality of workload conditions associated with the memory device, wherein the plurality of workload conditions comprise data reflecting a performance condition of the memory device. The processing device determines, while the memory device is in the first state condition, a host rate of a host system write performance for the memory device based on one or more workload conditions of the plurality of workload conditions. The processing device determines that one or more workload conditions of the plurality of workload conditions satisfies a first threshold criterion. Responsive to determining that the one or more workload conditions of the plurality of workload conditions satisfies the first threshold criterion, the processing device detects a change in a condition of the memory device from the first state to a second state. The processing device determines, while the memory device is in the second state condition, an adjusted host rate based on the host rate and a calculated adjustment value. The processing device uses the adjusted host rate to determine a credit consuming rate for a host write operation for the memory device.

20 Claims, 5 Drawing Sheets

300

Identify, while the memory device is in a first state condition, a plurality of workload conditions associated with the memory device 304

Determine, while the memory device is in the first state condition, a host rate of a host system write performance for the memory device 306

Determine that one or more workload conditions of the memory device conditions satisfies a first threshold criterion 308

Detecting a change in a condition of the memory device from the first state to a second state 310

Determine, while the memory device is in the second state condition, an adjusted host rate 312

Use the adjusted host rate to determine a credit consuming rate for a host write operation for the memory device 314

FIG. 3

IMPLEMENTING AUTOMATIC RATE CONTROL IN A MEMORY SUB-SYSTEM

TECHNICAL FIELD

Embodiments of the disclosure relate generally to memory sub-systems, and more specifically, relate to implementing automatic rate control in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to implement automatic rate control for a memory device in accordance with some embodiments of the present disclosure.

DETAILED DESCRIPTION

Figure 1:
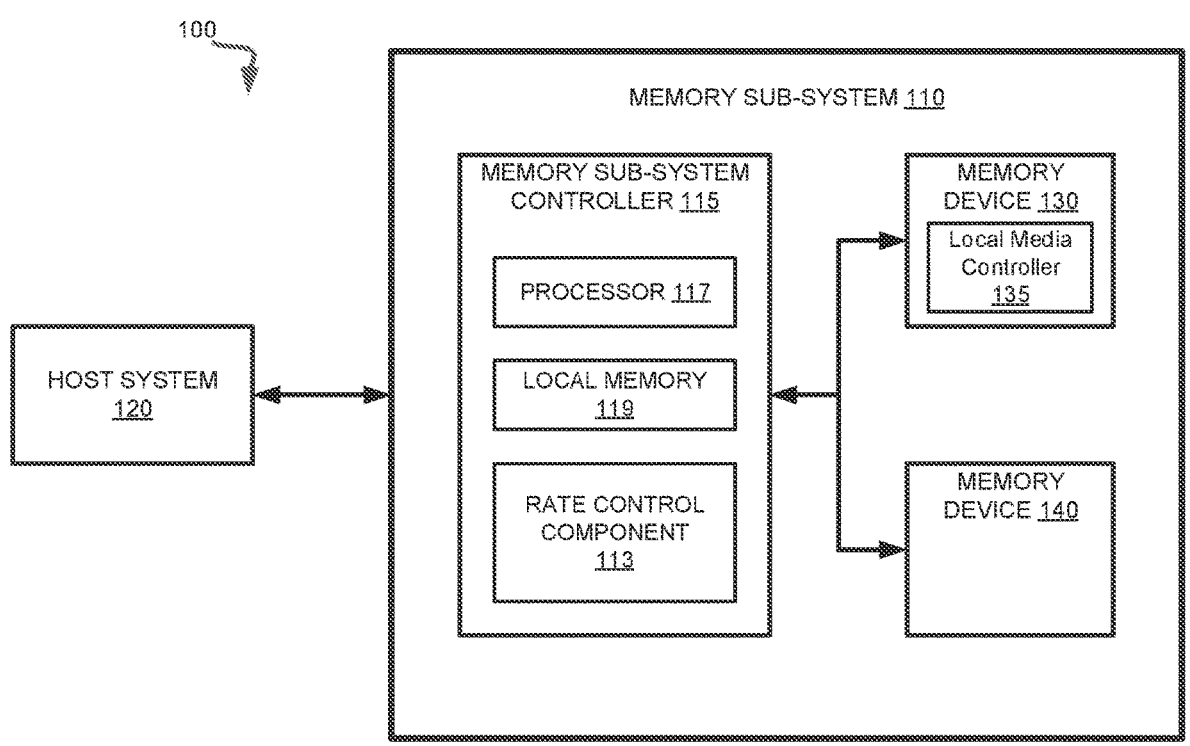
FIG. 1 illustrates an example computing system that includes a memory sub-system in accordance with some embodiments of the present disclosure.

Aspects of the present disclosure are directed to implementing automatic rate control in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

When data is written to the memory sub-system, it is typically done at the page level, such that an entire page, or multiple pages, is written in a single operation. In a conventional memory sub-system, a host system can provide data to be written to the memory sub-system. When the memory sub-system is full, such that there is insufficient capacity to accept additional write operations from the host system, certain data can be erased in order to free up space. When data is erased from the memory sub-system, however, it is typically done at the block level, such that an entire block (including multiple pages) is erased in a single operation. Thus, when a particular segment of data on the memory sub-system is updated, for example, certain pages in a block will have data that has been rewritten to a different page and/or is no longer needed. The entire block cannot simply be erased as each block likely also has some number of pages of valid data. A media management operation (e.g., a garbage collection process) can be performed which involves moving those pages of the block that contain valid data to another block, so that the current block can be erased and rewritten. Garbage collection is a form of automatic memory management that attempts to reclaim garbage, or memory occupied by stale data objects that are no longer in use (e.g., because they have been updated with new values). Garbage collection can be performed on a block stripe, e.g., a collection of blocks that are treated as a unit. The block stripe can be a single block or one or more blocks. Moving data from one block to another during the garbage collection process results in additional writes to the memory sub-system. The amount of valid data from each page that needs to be moved per block to another block is known as a Physical Valid Translation-Unit Count (PVTC) rate. The lower the PVTC rate, the slower the garbage collection process needs to run.

In a conventional memory sub-system, the performance seen by the host system is dependent on the speed at which the media management operation (e.g., garbage collection process) runs. If the host system issues write commands at a rate faster than the garbage collection process is performed, the memory sub-system may not have enough free space remaining for the host system to write to and would thus need to wait until the garbage collection process frees up space. This uneven balance between the host system and the garbage collection process can result in unstable performance if there are fluctuating workload condition changes that affect how fast the host system and the garbage collection process are each running. Host systems utilizing conventional memory sub-systems are designed to perform according to a customer's expectations under stable or changing workload conditions. However, since the performance seen by the host system depends on the speed of the garbage collection process, it may fail to meet the customer's expectations under stable or changing workload conditions.

Aspects of the present disclosure address the above and other deficiencies by having a memory sub-system that implements automatic rate control to determine a host rate and a garbage collection rate for a memory sub-system. In one embodiment, the memory sub-system can determine the host rate and the garbage collection rate in order to control the flow of operations (e.g., write operations) from the host system and the garbage collection process. For example, the host rate and the garbage collection rate can be used in a time-based credit mechanism that allocates a certain number of credits to both the host system and the garbage collection process in order to control the flow of operations from the host system and the garbage collection process. The host rate and the garbage collection rate can be used to determine the rate at which the host system and the garbage collection process can consume each allocated credit. Either of the host system and garbage collection process can each only be allowed to run if they have a positive credit balance. If the host system or garbage collection process has a credit balance that is zero or negative, the credit balance can be replenished. In one embodiment, the memory sub-system can determine the host rate and the garbage collection rate using two types of memory conditions—a first state and a second state memory condition. In one embodiment, while the memory device is in the first state memory condition, the memory sub-system identifies a set of workload conditions of the memory device. In one embodiment, the set of workload conditions can include host write performance statistics, garbage collection statistics, current drive conditions, and/or any other conditions or statistics. The memory sub-system determines, based on the identified workload conditions of the memory device, a host rate for write operations performed by the host system. When the memory sub-system determines that the identified workload conditions satisfy a criterion, the memory sub-system detects a change in the memory condition from the first state memory condition to a second state memory condition. While in the second state memory condition, the memory sub-system adjusts the host rate for write operations performed by the host system and can use the adjusted host rate to determine the rate at which the host system can consume its allocated credits for write operations. In one embodiment, the memory sub-system determines, while the memory device is in the first state memory condition, a garbage collection rate for write operations performed by a garbage collection process. The memory sub-system can then use the garbage collection rate to determine the rate at which the garbage collection process can consume its allocated credits for write operations.

Advantages of the present disclosure include, but are not limited to, improving the performance of a memory sub-system. As described above, since the host system and the garbage collection process can interfere with the respective performance of each if there is an uneven balance of host rate and garbage collection rate, the memory sub-system must stabilize the competing host system and garbage collection process. Implementing automatic rate control such as in a time-based credit mechanism as described above would allow the memory sub-system to control the flow of the host system and the garbage collection process by finding an optimal host rate and garbage collection rate. This would enable the memory sub-system to maintain a more stable host performance even when there are fluctuations in workload conditions affecting the garbage collection process. Further, the automatic rate control method can be configured for multiple types of memory sub-systems with different workload capacities and memory conditions without sacrificing the performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a rate control component 113 that can implement automatic rate control. In some embodiments, the memory sub-system controller 115 includes at least a portion of the rate control component 113. In some embodiments, the rate control component 113 is part of the host system 120, an application, or an operating system. In other embodiments, local media controller 135 includes at least a portion of rate control component 113 and is configured to perform the functionality described herein.

The rate control component 113 can implement automatic rate control for the memory sub-system 110. In one embodiment, the rate control component 113 can identify, while a memory device 130 is in a first state memory condition, a set of workload conditions associated with the memory device 130. In one embodiment, the set of workload conditions include data reflecting a performance condition of the memory device 130. In one embodiment, the set of workload conditions include data reflecting the performance of the host system 120 and the garbage collection process. In one embodiment, the rate control component 113 can determine a host rate of the write performance of the host system 120 for the memory device based on the identified set of workload conditions. The rate control component 113 can determine that one or more of the workload conditions satisfies a threshold criterion. The rate control component 113 can detect a change in the condition of the memory device 130 from the first state memory condition to a second state memory condition. In one embodiment, the rate control component 113 can determine, while the memory device 130 is in the second state memory condition, an adjusted host rate to account for changes in free space. In one embodiment, the rate control component 113 can use the adjusted host rate to determine a credit consuming rate for write operations for the host system 120 for the memory device. Further details with regard to the operations of the rate control component 113 are described below.

Figure 2:
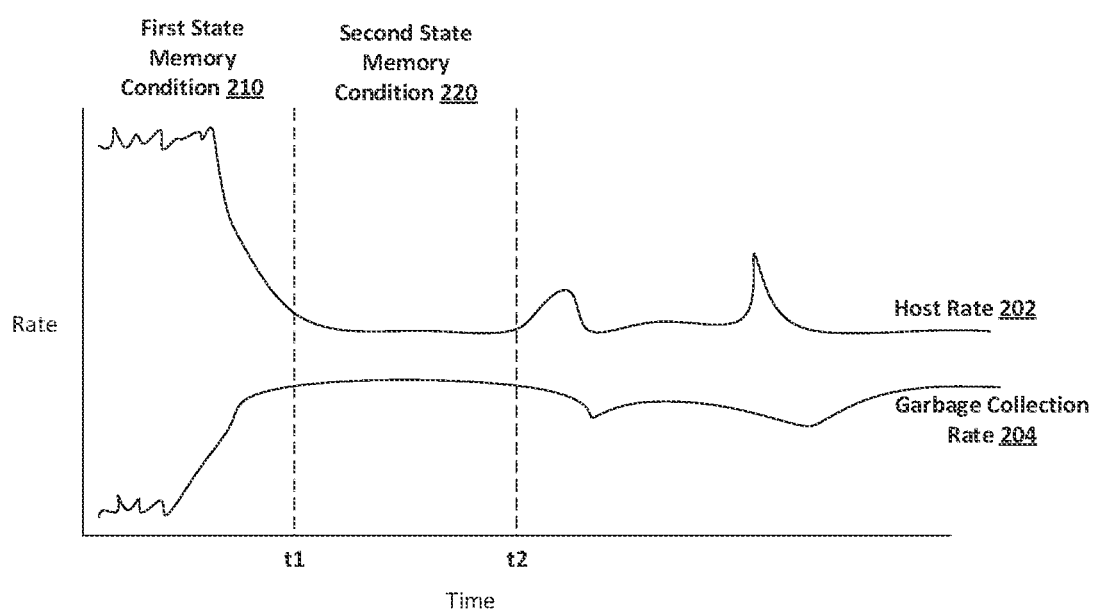
FIG. 2 is an example graph of a host rate and garbage collection rate over time during a first state memory condition and a second state memory condition of a memory device in accordance with some embodiments of the present disclosure.

FIG. 2 is an example graph of a host rate and garbage collection rate over time during a first state memory condition and a second state memory condition of a memory device in accordance with some embodiments of the present disclosure. In one embodiment, FIG. 2 depicts the host rate and garbage collection rate for write operations performed by a host system (e.g., the host system 120 of FIG. 1) and a garbage collection process. For example, the host rate 202 represents a rate at which the host system 120 can issue memory access operations (e.g., a number of write commands issued in a certain period of time) and the garbage collection rate 204 represents a rate at which memory sub-system controller 115 can perform media management operations (e.g., a number of garbage collection operations performed in a certain period of time). In one embodiment, the first state memory condition 210 is a searching state where the host rate 202 and the garbage collection rate 204 are unstable. When the host rate 202 and the garbage collection rate 204 reach a balance (e.g., at time t1), the memory device detects a change in the condition of the memory device from the first state memory condition 210 to the second state memory condition 220. During the second state memory condition 220, the host rate 202 and the garbage collection rate 204 are balanced and stable under stable workload conditions. In one embodiment, the memory device detects a change in the condition of the memory device from the second state memory condition to the first state memory condition (e.g., at time t2) if there are any changes in, for example, the workload conditions. Further details with regard to the host rate and garbage collection rate during the first and second state memory conditions are described below.

FIG. 3 is a flow diagram of an example method 300 to implement automatic rate control for a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the rate control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 304, the processing logic identifies a set of workload conditions associated with a memory device, such as memory device 130. In one embodiment, the processing logic identifies the set of workload conditions while the memory device is in a first state condition. The set of workload conditions can include data reflecting a performance condition of the memory device. In one embodiment, the set of workload conditions can include host write performance statistics, garbage collection statistics, current drive conditions, and/or any other conditions or statistics. For example, the set of workload conditions can include, but is not limited to, a number of host writes and a number of host reads performed by a host system (e.g., the host system 120 of FIG. 1), a number of write operations performed by a garbage collection process, an amount of free space, and a PVTC rate for a block stripe of the memory device currently being processed by the garbage collection process. In one embodiment, the performance condition can include a stable or unstable host performance. For example, a stable host performance can be a memory device that meets a customer or user's expectations. The first state can be a memory condition of the memory device where the performance condition of the memory device is unstable.

At operation 306, the processing logic determines a host rate for the memory device while the memory device is in the first state condition. In one embodiment, the host rate is the rate of write operations performed by the host system. In one embodiment, the processing logic determines the host rate based on one or more workload conditions of the set of workload conditions. In one embodiment, the one or more workload conditions can include a garbage collection rate. The processing logic can determine the garbage collection rate for a current block stripe of the memory device being processed by the garbage collection process based on one or more workload conditions, including a current host write count, a current host read count, and a total write allowance count. The total write allowance count is determined based on a maximum throughput of the memory device for a period of time. In one embodiment, the one or more workload conditions can include a current victim rate (e.g., PVTC rate) corresponding to a set of valid data on a block stripe of the memory device. The block stripe can be the current block stripe that is being garbage collected by the garbage collection process. The processing logic can determine the current victim rate for the block stripe by identifying how much data from the block stripe needs to be collected by the garbage collection process. In one embodiment, the one or more workload conditions can include a target free space for the memory device. The target free space can be a set number stored in the memory device. In one embodiment, the one or more workload conditions can include a current free space for the memory device. The processing logic can determine the current free space for the memory device based on calculating a number of free pages available on the memory device. The number of free pages can include the pages that are free, being erased, pending to be erased, or erased on the memory device. In one embodiment, the processing logic can determine the host rate for the memory device based at least on the garbage collection rate, the current victim rate, the target free space, and the current free space. In one embodiment, the processing logic calculates a reference host rate based on the garbage collection rate and the current victim rate for the current block stripe. The processing logic determines the host rate based on the reference host rate and the current free space. For example, determining the host rate can include adjusting the reference host rate according to the current free space. In one embodiment, the processing logic uses the host rate to determine a credit consuming rate. In one embodiment, the credit consuming rate can be used for a time-based credit mechanism to control the rate at which the host system performs write operations for the memory device. In one embodiment, the credit consuming rate can be used to control the rate at which the host system performs read operations for the memory device. In one embodiment, the processing logic uses the garbage collection rate to determine a credit consuming rate for the garbage collection process, including any write operations performed by the garbage collection process.

At operation 308, the processing logic determines that one or more workload conditions of the set of workload conditions satisfies a threshold criterion. In one embodiment, the processing logic can determine a ratio between an expected garbage collection write count for the memory device and an expected host write count for the memory device. The expected garbage collection write count and the expected host write count can be calculated by the processing logic based on the current victim rate for the current block stripe. In one embodiment, the processing logic can determine a ratio between an actual garbage collection write count for the memory device and an actual host write count for the memory device. The processing logic can determine the ratio between the actual garbage collection write count and the actual host write count based on one or more of the set of workload conditions, e.g., host write performance statistics and garbage collection statistics. The processing logic can identify a match by comparing the ratio between the expected garbage collection write count and the expected host write count and the ratio between the actual garbage collection write count and the actual host write count. If the ratios are equivalent or close in range (e.g., within a threshold amount of each other), then the processing logic can determine that the ratios match. In one embodiment, the processing logic can determine a target free space for the memory device. The target free space can be a set number stored in the memory device. In one embodiment, the processing logic can determine a current free space for the memory device based on one or more of the set of workload conditions, e.g., current drive conditions. In one embodiment, the processing logic can determine the current free space of the memory device is equivalent to or close in range to the target free space for the memory device. In one embodiment, the processing logic determines that the one or more workload conditions of the plurality of workload conditions satisfies the threshold criterion if there is a match between the two ratios and if the current free space of the memory device is equivalent to or close in range to the target free space for the memory device.

At operation 310, the processing logic detects a change in a condition of the memory device from the first state memory condition to a second state memory condition. In one embodiment, the processing logic detects a change in a host workload pattern of the memory device from the first state memory condition to a second state memory condition. In one embodiment, the processing logic records a reference free space for the memory device, which reflects one or more free pages available on the memory device when the memory device changes from the first state memory condition to the second state memory condition. In one embodiment, the processing logic determines, while the memory device is in the second state memory condition, a current free space for the memory device, which reflects one or more free pages available on the memory device during the second state memory condition. In one embodiment, the processing logic determines, while the memory device is in the second state, an adjustment value based at least on the recorded reference free space during the first state memory condition and the current free space of the memory device while in the second state memory condition. In one embodiment, the second state can be a memory condition of the memory device wherein the performance condition of the memory device is stable.

At operation 312, the processing logic determines an adjusted host rate. In one embodiment, the processing logic records the host rate when the processing logic first detects the change in the condition of the memory device from the first state to the second state. In one embodiment, the processing logic determines the adjusted host rate based on the recorded host rate and the adjustment value. In one embodiment, the processing logic determines a garbage collection rate for the second state memory condition. The processing logic can determine the garbage collection rate based on one or more workload conditions, including a current host write count, a current host read count, and a total write allowance. The write allowance count is determined based on a maximum throughput of the memory device for a period of time.

At operation 314, the processing logic uses the adjusted host rate to determine the credit consuming rate. In one embodiment, the credit consuming rate can be used for the time-based credit mechanism to control the rate at which the host system performs write operations for the memory device. In one embodiment, the processing logic uses the garbage collection rate to determine the credit consuming rate for the garbage collection process. In one embodiment, the processing logic can detect a change in the condition of the memory device from the second state memory condition to the first state memory condition. In one embodiment, detecting the change in the condition of the memory device from the second state to the first state can include determining that a current victim rate (e.g., PVTC rate) satisfies a threshold criterion while the memory device is in the second state condition. In one embodiment, the current victim rate corresponds to a set of valid data on a block stripe of the memory device. The block stripe can be the current block stripe that is being garbage collected by the garbage collection process. In one embodiment, the threshold criterion can include a low PVTC rate. In one embodiment, detecting the change in the condition of the memory device from the second state to the first state can include determining that a current free space for the memory device and a target free space for the memory device do not satisfy a threshold criterion. For example, the threshold criterion can include a range around the target free space in which the current free space must be. In one embodiment, detecting the change in the condition of the memory device from the second state to the first state can include determining a change in the workload associated with host write and read operations from when the second state memory condition was first entered to the current workload. In one embodiment, detecting the change in the condition of the memory device from the second state to the first state can include determining a low host write and/or host read usage.

Figure 4:
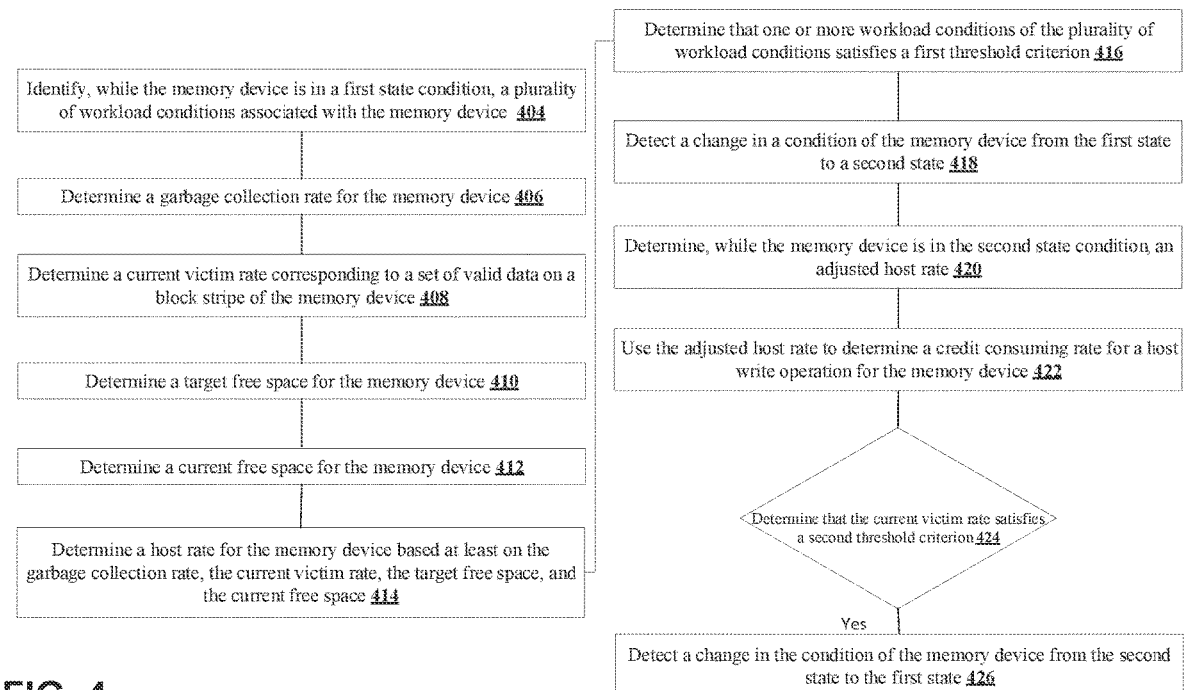
FIG. 4 is a flow diagram of an example method to implement automatic rate control for a memory device in accordance with some embodiments of the present disclosure.

FIG. 4 is a flow diagram of an example method 400 to implement an automatic rate control method for a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the rate control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 404, the processing logic identifies a set of workload conditions associated with a memory device, such as memory device 130. In one embodiment, the processing logic identifies the set of workload conditions while the memory device is in a first state condition. The set of workload conditions can include data reflecting a performance condition of the memory device. In one embodiment, the set of workload conditions can include host write performance statistics, garbage collection statistics, current drive conditions, and/or any other conditions or statistics. For example, the set of workload conditions can include, but is not limited to, a number of host writes and a number of host reads performed by a host system (e.g., the host system 120 of FIG. 1), a number of write operations performed by a garbage collection process, an amount of free space, and a PVTC rate for a current block stripe of the memory device being processed by the garbage collection process. In one embodiment, the performance condition can include a stable or unstable host performance. For example, a stable host performance can be a memory device that meets a customer or user's expectations. The first state can be a memory condition of the memory device where the performance condition of the memory device is unstable.

At operation 406, the processing logic determines a garbage collection rate for the current block stripe. The processing logic can determine the garbage collection rate for the current block stripe based on one or more workload conditions, including a current host write count, a current host read count, and a total write allowance count. The total write allowance count is determined based on a maximum throughput of the memory device for a period of time.

At operation 408, the processing logic determines a current victim rate (e.g., PVTC rate) corresponding to a set of valid data on the current block stripe of the memory device. The processing logic can determine the current victim rate for the current block stripe by identifying how much data from the block stripe needs to be collected by the garbage collection process.

At operation 410, the processing logic determines a target free space for the memory device. The target free space can be a set number stored in the memory device.

At operation 412, the processing logic determines a current free space for the memory device. The processing logic can determine the current free space for the memory device based on calculating a number of free pages available on the memory device. The number of free pages can include the pages that are free, being erased, pending to be erased, or erased on the memory device.

At operation 414, the processing logic determines a host rate for the memory device. In one embodiment, the host rate is the rate of write operations performed by the host system. In one embodiment, the processing logic determines the host rate based on one or more workload conditions of the set of workload conditions. In one embodiment, the one or more workload conditions include at least the garbage collection rate, the current victim rate, the target free space, and the current free space. In one embodiment, the processing logic calculates a reference host rate based on the garbage collection rate and the current victim rate for the current block stripe. The processing logic determines the host rate based on the reference host rate and the current free space. For example, determining the host rate can include adjusting the reference host rate according to the current free space. In one embodiment, the processing logic uses the host rate to determine a credit consuming rate. In one embodiment, the credit consuming rate can be used for a time-based credit mechanism to control the rate at which the host system performs write operations for the memory device. In one embodiment, the credit consuming rate can be used to control the rate at which the host system performs read operations for the memory device. In one embodiment, the processing logic uses the garbage collection rate to determine a credit consuming rate for the garbage collection process, including any write operations performed by the garbage collection process.

At operation 416, the processing logic determines that one or more workload conditions of the set of workload conditions satisfies a first threshold criterion. In one embodiment, the processing logic can determine a ratio between an expected garbage collection write count for the memory device and an expected host write count for the memory device. The expected garbage collection write count and the expected host write count can be calculated by the processing logic based on the current victim rate for the current block stripe. In one embodiment, the processing logic can determine a ratio between an actual garbage collection write count for the memory device and an actual host write count for the memory device. The processing logic can determine the ratio between the actual garbage collection write count and the actual host write count based on one or more of the set of workload conditions, e.g., host write performance statistics and garbage collection statistics. The processing logic can identify a match by comparing the ratio between the expected garbage collection write count and the expected host write count and the ratio between the actual garbage collection write count and the actual host write count. If the ratios are equivalent or close in range (e.g., within a threshold amount of each other), then the processing logic can determine that the ratios match. In one embodiment, the processing logic can determine a target free space for the memory device. The target free space can be a set number stored in the memory device. In one embodiment, the processing logic can determine a current free space for the memory device based on one or more of the set of workload conditions, e.g., current drive conditions. In one embodiment, the processing logic can determine the current free space of the memory device is equivalent to or close in range to the target free space for the memory device. In one embodiment, the processing logic determines that the one or more workload conditions of the plurality of workload conditions satisfies the threshold criterion if there is a match between the two ratios and if the current free space of the memory device is equivalent to or close in range to the target free space for the memory device.

At operation 418, the processing logic detects a change in a condition of the memory device from the first state memory condition to a second state memory condition. In one embodiment, the processing logic records a reference free space for the memory device, which reflects one or more free pages available on the memory device when the memory device changes from the first state memory condition to the second state memory condition. In one embodiment, the processing logic determines, while the memory device is in the second state condition, an adjustment value based at least on the recorded reference free space and a current free space of the memory device while in the second state memory condition. In one embodiment, the second state can be a memory condition of the memory device wherein the performance condition of the memory device is stable.

At operation 420, the processing logic determines an adjusted host rate. In one embodiment, the processing logic records the host rate when the processing logic first detects the change in the condition from the first state to the second state. In one embodiment, the processing logic determines the adjusted host rate based on the recorded host rate and the adjustment value. In one embodiment, the processing logic determines a garbage collection rate for the second state memory condition. The processing logic can determine the garbage collection rate based on one or more workload conditions, including a current host write count, a current host read count, and a total write allowance. The write allowance count is determined based on a maximum throughput of the memory device for a period of time.

At operation 422, the processing logic uses the adjusted host rate to determine the credit consuming rate. In one embodiment, the credit consuming rate can be used for the time-based credit mechanism to control the rate at which the host system performs write operations for the memory device. In one embodiment, the credit consuming rate can be used to control the rate at which the host system performs read operations for the memory device. In one embodiment, the processing logic uses the garbage collection rate to determine the credit consuming rate for the garbage collection process, including any write operations performed by the garbage collection process.

At operation 424, the processing logic determines that the current victim rate satisfies a threshold criterion. In one embodiment, the threshold criterion can include a low PVTC rate while the memory device is in the second state.

At operation 426, if the current victim rate satisfies the threshold criterion, the processing logic can detect a change in the condition of the memory device from the second state memory condition to the first state memory condition. In one embodiment, the processing logic can detect the change in the condition of the memory device from the second state memory condition to the first state memory condition based on determining that a current free space for the memory device and a target free space for the memory device do not satisfy a threshold criterion. For example, the threshold criterion can include a range around the target free space in which the current free space must be. In one embodiment, the processing logic can detect the change in the condition of the memory device from the second state memory condition to the first state memory condition based on determining a change in the workload associated with host write and read operations when the second state memory condition was first entered to the current workload. In one embodiment, the processing logic can detect a change in the condition of the memory device from the second state memory condition to the first state memory condition based on determining a low host write and/or host read usage.

Figure 5:
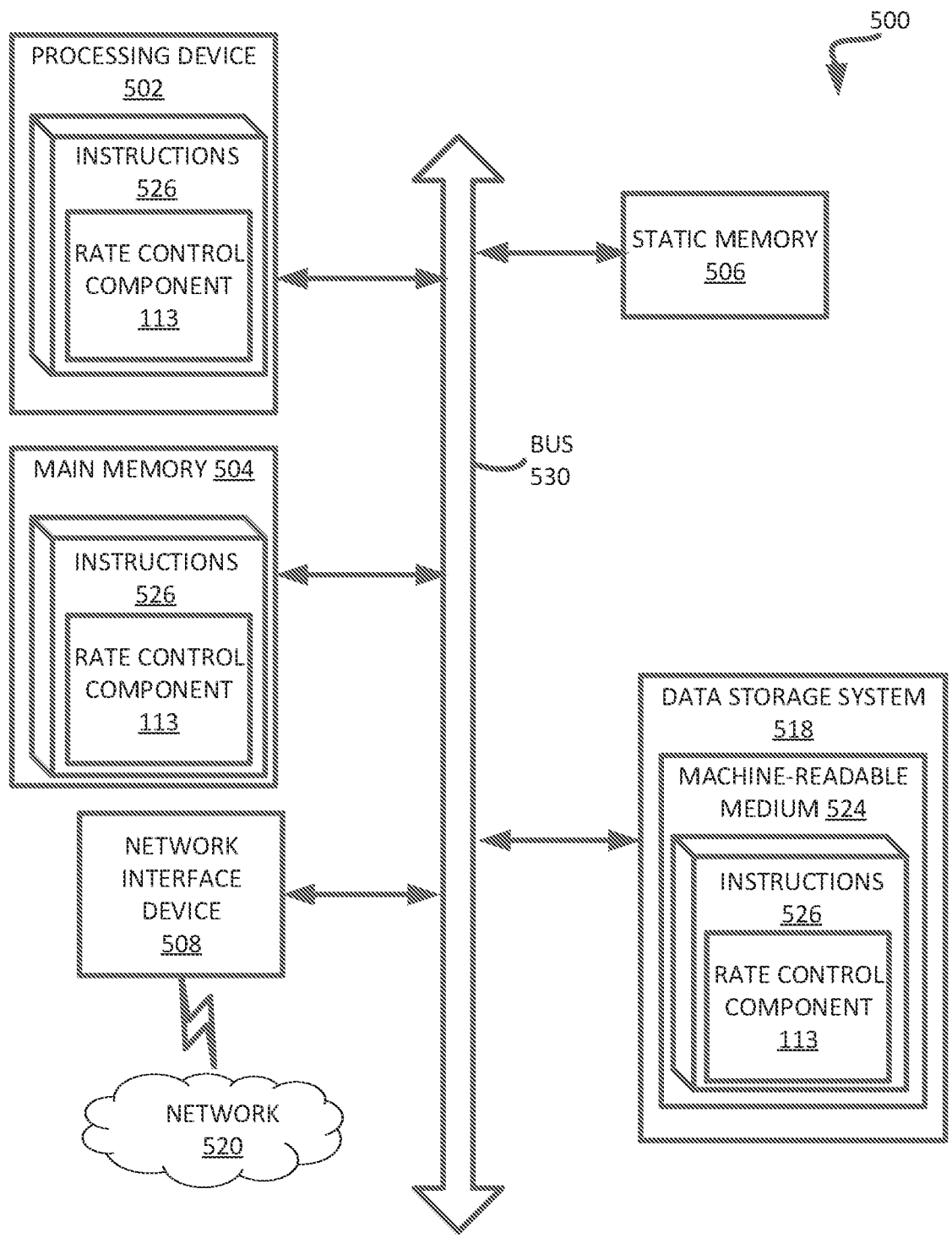
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the rate control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a rate control component (e.g., the rate control component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying, while the memory device is in a first state condition, a plurality of workload conditions associated with the memory device, wherein the plurality of workload conditions comprise data reflecting a performance condition of the memory device;
determining, while the memory device is in the first state condition, a host rate of a host system write performance for the memory device based on one or more workload conditions of the plurality of workload conditions;
determining that one or more workload conditions of the plurality of workload conditions satisfies a first threshold criterion;
responsive to determining that the one or more workload conditions of the plurality of workload conditions satisfies the first threshold criterion, detecting a change in a condition of the memory device from the first state condition to a second state condition;
determining, while the memory device is in the second state condition, an adjusted host rate based on the host rate and a calculated adjustment value; and
using the adjusted host rate to determine a credit consuming rate for a host write operation for the memory device.

2. The system of claim 1, wherein determining the host rate for the memory device based on the one or more workload conditions of the plurality of workload conditions comprises:

determining a garbage collection rate for the memory device;
determining a current victim rate corresponding to a set of valid data on a block stripe of the memory device, wherein a garbage collection process is being performed on the block stripe;
determining a target free space for the memory device;
determining a current free space for the memory device; and
determining the host rate for the memory device based at least on the garbage collection rate, the current victim rate, the target free space, and the current free space.

3. The system of claim 1, wherein determining that the one or more workload conditions of the plurality of workload conditions satisfies the first threshold criterion comprises:
determining a first ratio between an expected garbage collection write count for the memory device and an expected host write count for the memory device;
determining a second ratio between an actual garbage collection write count for the memory device and an actual host write count for the memory device; and
identifying a match between the first ratio and the second ratio.

4. The system of claim 3, wherein determining that the one or more workload conditions of the plurality of workload conditions satisfies the first threshold criterion further comprises:
determining a target free space for the memory device;
determining a current free space for the memory device; and
determining that the current free space of the memory device is within a threshold amount of the target free space for the memory device.

5. The system of claim 1, wherein the processing device is configured to perform operations further comprising:
detecting a change in the condition of the memory device from the second state to the first state, wherein detecting the change in the condition of the memory device from the second state to the first state comprises determining that a current victim rate satisfies a second threshold criterion, wherein the current victim rate corresponds to a set of valid data on a block stripe of the memory device, wherein a garbage collection process is being performed on the block stripe.

6. The system of claim 1, wherein the processing device is configured to perform operations further comprising:
detecting a change in the condition of the memory device from the second state to the first state, wherein detecting the change in the condition of the memory device from the second state to the first state comprises determining that a current free space for the memory device and a target free space for the memory device do not satisfy a threshold range criterion.

7. The system of claim 1, wherein the processing device is configured to perform operations further comprising:
responsive to determining that the first threshold criterion is satisfied, determining, while the memory device is in the first state condition, a reference free space for the memory device, wherein the reference free space reflects one or more free pages of the memory device during the change in the condition of the memory device from the first state to the second state;
responsive to detecting the change in the condition of the memory device from the first state to the second state, determining, while the memory device is in the second state condition, a current free space for the memory device, wherein the current free space reflects one or more free pages of the memory device; and
determining, while the memory device is in the second state condition, the calculated adjustment value based at least on the reference free space and the current free space.

8. The system of claim 1, wherein the first state comprises a memory condition wherein the performance condition of the memory device is unstable, and wherein the second state comprises a memory condition wherein the performance condition of the memory device is stable.

9. A method comprising:
identifying, while a memory device is in a first state condition, a plurality of workload conditions associated with the memory device, wherein the plurality of workload conditions comprise data reflecting a performance condition of the memory device;
determining, while the memory device is in the first state condition, a host rate of a host system write performance for the memory device based on one or more workload conditions of the plurality of workload conditions;
determining that one or more workload conditions of the plurality of workload conditions satisfies a first threshold criterion;
responsive to determining that the one or more workload conditions of the plurality of workload conditions satisfies the first threshold criterion, detecting a change in a condition of the memory device from the first state condition to a second state condition;
determining, while the memory device is in the second state condition, an adjusted host rate based on the host rate and a calculated adjustment value; and
using the adjusted host rate to determine a credit consuming rate for a host write operation for the memory device.

10. The method of claim 9, wherein determining the host rate for the memory device based on the one or more workload conditions of the plurality of workload conditions comprises:
determining a garbage collection rate for the memory device;
determining a current victim rate corresponding to a set of valid data on a block stripe of the memory device, wherein a garbage collection process is being performed on the block stripe;
determining a target free space for the memory device;
determining a current free space for the memory device; and
determining the host rate for the memory device based at least on the garbage collection rate, the current victim rate, the target free space, and the current free space.

11. The method of claim 9, wherein determining that the one or more workload conditions of the plurality of workload conditions satisfies the first threshold criterion comprises:
determining a first ratio between an expected garbage collection write count for the memory device and an expected host write count for the memory device;
determining a second ratio between an actual garbage collection write count for the memory device and an actual host write count for the memory device; and
identifying a match between the first ratio and the second ratio.

12. The method of claim 11, wherein determining that the one or more workload conditions of the plurality of workload conditions satisfies the first threshold criterion further comprises:
  determining a target free space for the memory device;
  determining a current free space for the memory device; and
  determining that the current free space of the plurality of block stripes is within a threshold amount of the target free space for the memory device.

13. The method of claim 9, further comprising:
  detecting a change in the condition of the memory device from the second state to the first state, wherein detecting the change in the condition from the second state to the first state comprises determining that a current victim rate satisfies a second threshold criterion, wherein the current victim rate corresponds to a set of valid data on a block stripe of the memory device, wherein a garbage collection process is being performed on the block stripe.

14. The method of claim 9, further comprising:
  responsive to determining that the first threshold criterion is met, determining, while the memory device is in the first state condition, a reference free space for the memory device, wherein the reference free space reflects one or more free pages of the memory device during the change in the condition of the memory device from the first state to the second state;
  responsive to detecting the change in the condition of the memory device from the first state to the second state, determining, while the memory device is in the second state condition, a current free space for the memory device, wherein the current free space reflects one or more free pages of the memory device; and
  determining, while the memory device is in the second state condition, the adjustment value based at least on the reference free space and the current free space.

15. The method of claim 9, wherein the first state comprises a memory condition wherein the performance condition of the memory device is unstable, and wherein the second state comprises a memory condition wherein the performance condition of the memory device is stable.

16. A non-transitory computer-readable storage medium comprising instructions that, when executed by a processing device, cause the processing device to perform operations comprising:
  identifying, while a memory device is in a first state condition, a plurality of workload conditions associated with the memory device, wherein the plurality of workload conditions comprise data reflecting a performance condition of the memory device, and wherein the first state comprises a memory condition wherein the performance condition of the memory device is unstable;
  determining, while the memory device is in the first state condition, a host rate of a host system write performance for the memory device based on one or more workload conditions of the plurality of workload conditions;
  determining that one or more workload conditions of the plurality of workload conditions satisfies a first threshold criterion;
  responsive to determining that the one or more workload conditions of the plurality of workload conditions satisfies the first threshold criterion, detecting a change in a condition of the memory device from the first state to a second state, wherein the second state comprises a memory condition wherein the performance condition of the memory device is stable; and
  detecting a change in the condition of the memory device from the second state to the first state, wherein detecting the change in the condition of the memory device from the second state to the first state comprises determining that a current victim rate satisfies a second threshold criterion, wherein the current victim rate corresponds to a set of valid data on a block stripe of the memory device, wherein a garbage collection process is being performed on the block stripe.

17. The non-transitory computer-readable storage medium of claim 16, wherein the processing device is to perform operations further comprising:
  determining, while the memory device is in the second state condition, an adjusted host rate based on the host rate and a calculated adjustment value; and
  using the adjusted host rate to determine a credit consuming rate for a host write operation for the memory device.

18. The non-transitory computer-readable storage medium of claim 16, wherein determining that the one or more workload conditions of the plurality of workload conditions satisfies the first threshold criterion comprises:
  determining a first ratio between an expected garbage collection write count for the memory device and an expected host write count for the memory device;
  determining a second ratio between an actual garbage collection write count for the memory device and an actual host write count for the memory device; and
  identifying a match between the first ratio and the second ratio.

19. The non-transitory computer-readable storage medium of claim 18, wherein determining that the one or more workload conditions of the plurality of workload conditions satisfies the first threshold criterion further comprises:
  determining a target free space for the memory device;
  determining a current free space for the memory device; and
  determining that the current free space of the memory device is within a threshold amount of the target free space for the memory device.

20. The non-transitory computer-readable storage medium of claim 16, wherein the processing device is to perform operations further comprising:
  responsive to determining that the first threshold criterion is met, determining, while the memory device is in the first state condition, a reference free space for the memory device, wherein the reference free space reflects one or more free pages of the memory device during the change in the condition of the memory device from the first state to the second state;
  responsive to detecting a change in the condition of the memory device from the first state to the second state, determining, while the memory device is in the second state condition, a current free space for the memory device, wherein the current free space reflects one or more free pages of the memory device; and
  determining, while the memory device is in the second state condition, an adjustment value based at least on the reference free space and the current free space.

* * * * *